Oct. 14, 1969  L. PRIEFERT  3,472,402
PIPE-HANDLING ATTACHMENT FOR A TRACTOR
Filed Aug. 21, 1968  2 Sheets-Sheet 1
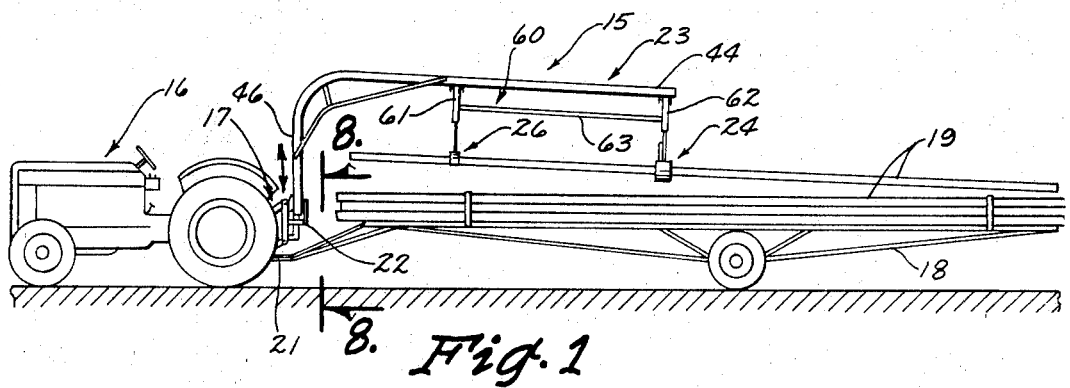
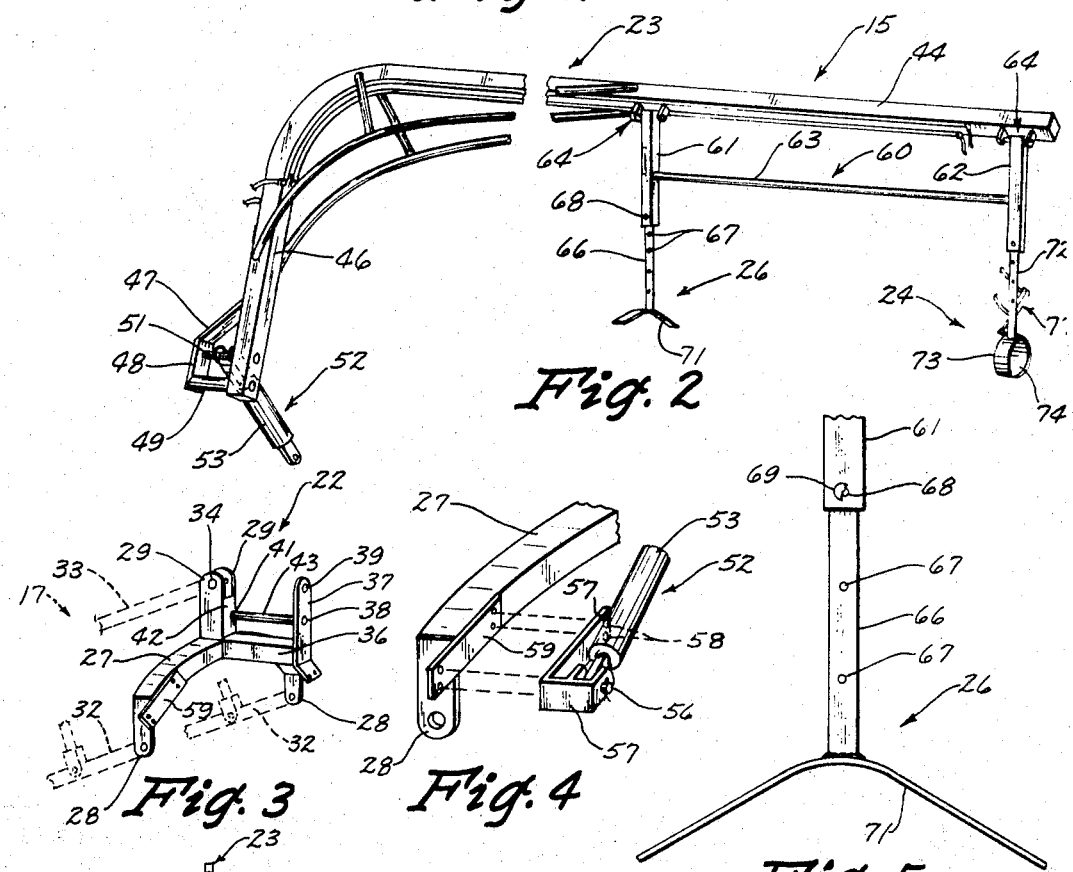
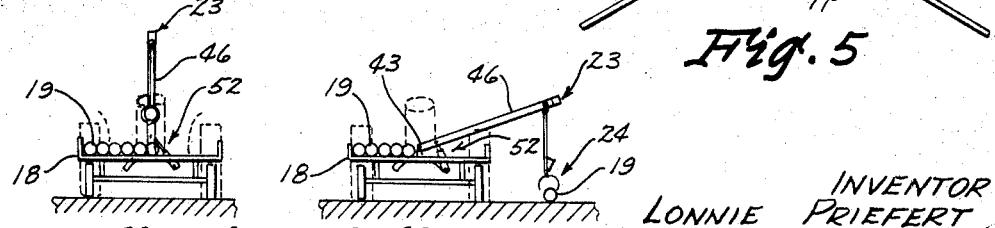
INVENTOR
LONNIE PRIEFERT
BY
ATTORNEY Oct. 14, 1969  L. PRIEFERT  3,472,402
PIPE-HANDLING ATTACHMENT FOR A TRACTOR
Filed Aug. 21, 1968  2 Sheets-Sheet 2
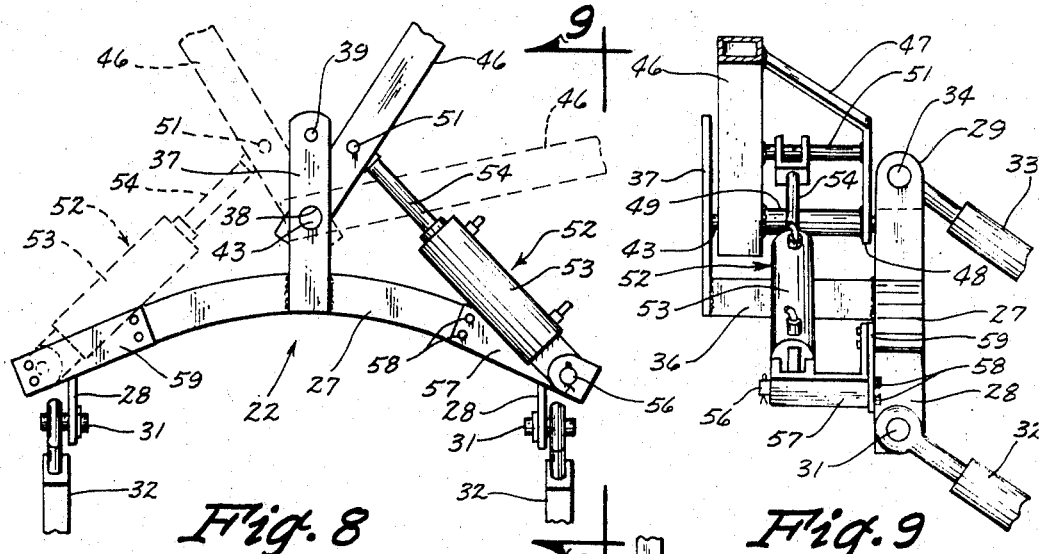
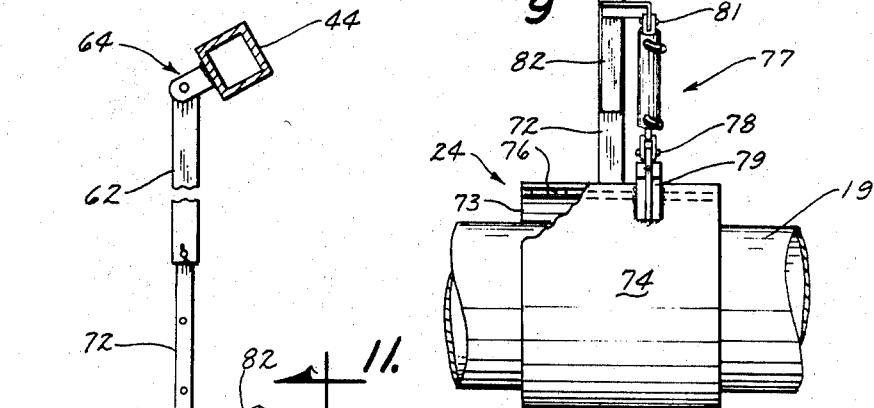
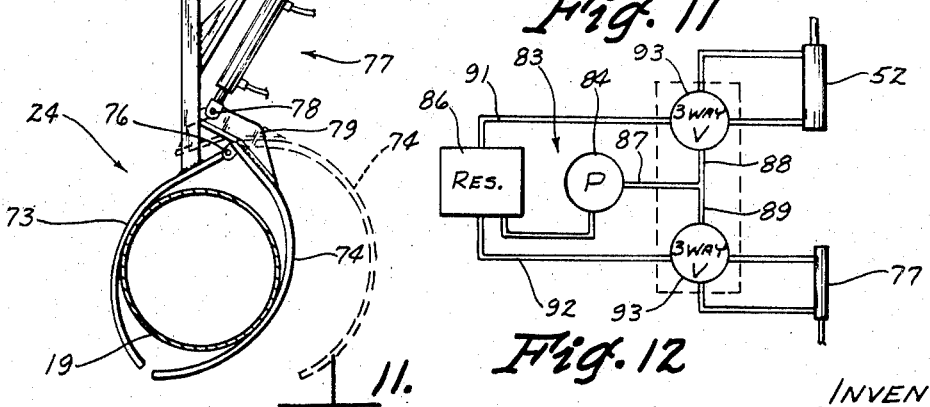
INVENTOR
LONNIE PRIEFERT
BY
ATTORNEY

United States Patent Office 3,472,402
Patented Oct. 14, 1969

3,472,402
PIPE-HANDLING ATTACHMENT FOR A TRACTOR
Lonnie Priefert, Belvidere, Nebr. 68315
Filed Aug. 21, 1968, Ser. No. 754,314
Int. Cl. B66c 1/62; B60p 1/48
U.S. Cl. 214—147                                    6 Claims

ABSTRACT OF THE DISCLOSURE

The attachment is intended for use in the handling of pipes for loading and unloading from a transport vehicle and more particularly to the handling of aluminum pipes used in farm irrigation systems. These pipes, although relatively light in weight, are bulky and inconvenient to manually handle. The attachment includes a boom member that has a main section extended rearwardly from the tractor and downturned front section. A mounting frame for the boom is carried on the usual hydraulic lift mechanism arranged at the rear end of a tractor and pivotally supports the lower end of the boom front section to provide for a pivotal movement of the boom about an axis extended longitudinally of the tractor. Pivotally supported in a longitudinaly spaced relation from the boom main section for free swinging movement about a common axis extended longitudinally of such main section are a pipe contact member and a pipe jaw unit or grab assembly, with the contact member located forwardly of the jaw unit. The contact member and jaw unit are spaced apart a distance that is less than one-half the length of a pipe to be handled so that when a pipe is loosely held in the jaw unit the forward section of the pipe is tilted upwardly into bearing engagement with the contact member to provide for a support of the pipe at a position below and extended longitudinally of the main boom section. On pivotal movement of the boom the pipe can be raised or lowered for removal from or loading onto a tractor drawn trailer.

SUMMARY OF THE INVENTION

The attachment provides for the easy and convenient handling of irrigation pipes by the operator of a tractor. The pipes, from positions strung along the ground, are readily lifted for loading into a tractor drawn trailer for transport to other ground areas where they are then separately removed from the trailer and laid along the ground in position for end to end connection. This job usually required a manual handling of the pipes by not less than two men one of which was the tractor operator. The operator thus had to repeatedly mount and dismount from the tractor to assist the second man in lifting the pipes onto the trailer or in unloading them from the trailer. All of this inconvenience is eliminated by the attachment of this invention which is of a simple compact construction, easily and readily installed in a short period of time on any tractor equipped with a rear end hydraulic lift mechanism, and efficient in operation to perform the pipe loading and unloading operations without requiring the tractor operator to leave the tractor.

DETAILED DESCRIPTION OF THE INVENTION

Further objects, features and advantages of the invention will become apparent from the following description when taken in consideration with the accompanying drawings in which:

FIG. 1 is a side elevational view of the attachment shown in assembly relation with a farm tractor and towed vehicle, with the attachment being illustrated in a position for loading a pipe on the trailer;

FIG. 2 is a side perspective view of a boom member which forms part of the attachment;

FIG. 3 is a perspective view of a tractor mounting frame for the attachment, illustrated in a carried position on the hydraulic lift mechanism of the tractor;

FIG. 4 is an exploded detail perspective view showing the assembly with the mounting frame of a hydraulic cylinder assembly for actuating the boom member;

FIG. 5 is an elevational view of a pipe contact member that forms part of the attachment;

FIGS. 6 and 7 are diagrammatic illustrations showing the unloading of a pipe from a tractor pulled trailer;

FIG. 8 is a rear elevational view of the tractor mounting frame of the attachment, as seen along line 8—8 in FIG. 1, showing the actuating cylinder for the boom member in alternate positions providing for the operation of the attachment to either side of the tractor;

FIG. 9 is a view as seen along the line 9—9 in FIG. 8;

FIG. 10 is an elevational view of a pipe jaw unit that forms part of the attachment;

FIG. 11 is an enlarged detailed view taken along the line 11—11 in FIG. 10; and

FIG. 12 is a schematic showing of the oil control system for the attachment.

Referring to the drawings the attachment, indicated generally at 15, is shown in FIG. 1 in assembly relation with a farm tractor 16 that is equipped with a usual rear end hydraulic lift mechanism 17 commonly referred to as a "three-point hitch." A trailer 18, for carrying the pipes 19 being handled by the attachment 15, is connected to the tractor draw bar 21.

The attachment includes a tractor mounting frame 22 (FIGS. 1 and 3), a swingable boom member 23 pivotally mounted on the frame 22, a pipe jaw unit 24 and a pipe contact means 26 spaced longitudinally of the boom 23 for free swinging movement together relative to the boom member.

The mounting frame 22 (FIGS. 3 and 8) has an upwardly bowed body member 27 formed of a tubular material and having flat ears 28 depending from its opposite ends. Intermediate such ends and projected upwardly from the convex surface of the body member 27 are a pair of spaced plates 29. The ears 28 are pivotally connected at 31 to the rear end of corresponding lift arms 32 that form part of the hydraulic lift mechanism 17. A control arm 33, that also forms part of the lift mechanism 17, has its rear end positioned between and pivotally connected at 34 to the upright plates 29. The two pivots 31 and the third pivot 34 constitute a three point connection of the mounting frame 22 with the lift mechanism 17 whereby the frame is raised and lowered with the lift arms 32 and is pivotally movable relative to the pivots 31 in response to the actuation of the control arm 33.

Projected rearwardly from and secured to the body member 27 of the mounting frame 22 is an arm member 36 (FIGS. 3 and 9) the rear end of which carries an upright plate 37 that is formed with a pair of vertically spaced holes 38 and 39. The hole 38 is arranged opposite a hole 41 that is formed in a brace plate 42 extended between and connected to the upright plates 29 on the body member 27. A pivot pin 43 is received within the openings 38 and 41 so as to be supported on the plates 37 and 42.

The boom member 23 (FIGS. 1 and 2) has a rearwardly extended main section 44 and a downwardly projected front section 46 the lower end of which is pivotally supported on the pivot pin 43. The boom 23 is of a tubular construction of a rectangular shape in transverse cross section. Secured to the forward side of the boom front section 46 and adjacent to its lower end is a hanger strap 47 that extends downwardly and forwardly from the boom front section and terminates in an upright bottom section 48. A tubular bearing member 49 extended between and secured to the lower end of the bottom section 48 and the lower end of the boom front section 46 rotatably receives the pivot pin 43. A pivot pin 51 (FIGS. 2 and 9) is connected to the bottom section 48 of the strap 47 and to the front boom section 46 in a vertically spaced relation above the tubular member 49.

With the mounting frame 22 attached to the lift mechanism 17 and with the boom member 23 pivotally supported on the mounting frame at the pin 43 it is seen that the boom member is swingable about an axis extended longitudinally of the tractor, with the main boom section 44 projected rearwardly and at an angle relative to a horizontal plane as determined by the adjustment of the control arm 33.

To pivotally move the boom member 23 there is provided a hydraulic cylinder assembly 52 (FIGS. 6 and 7) of double acting type which includes a cylinder 53 and associated piston rod 54. The closed end of the cylinder 52 is pivotally connected at 56 to a mounting bracket 57 (FIGS. 4 and 8) which is releasably attachable as by bolts 58 to one of a pair of base plates 59 that are welded to the rear surface of the body member 27 of the mounting frame 22 at positions such that the pivot 56 is at one end of the body member 27. The piston rod 54 has its free end pivotally connected to the pin 51.

With the pivots 43, 51 and 56 arranged in a parallel relation it is seen that on extension and retraction of the piston rod 54 the main boom section 44 is movable between an upper position shown in FIGS. 1 and 6, wherein the boom front section 46 is extended upwardly from its pivot support 43, to a lower position located outwardly from one side of the tractor (FIG. 7) wherein the front section 46 is inclined upwardly and outwardly toward such side of the tractor. For convenience this movement of the boom member 23 will be referred to as a right hand pipe handling operation.

For a left hand pipe-handling operation the mounting bracket 57 is removed from the right hand end of the body member 27, as shown in full lines in FIG. 8, and is then attached to the left hand end of the body member as shown in dotted lines in the same figure. In this transfer it will be understood that the pivot 51 for the piston rod 54 would be initially removed.

For the handling of the pipes 19 by the boom 23 there is provided a pivoted frame 60 (FIGS. 1 and 2) that extends longitudinally of and below the main bottom section 44. This pivoted frame 60 includes a pair of upright tubular end members 61 and 62 to be hereinafter referred to as front and rear tubular members, respectively. The tubular members 61 and 62 are connected together immediate their ends by a single brace member 63 and are pivotally supported at the upper ends thereof from the main boom section 44 by pivot assemblies 64 for pivoted movement about a common axis extended longitudinally of the main boom section 44. It is seen, therefore, that the pivoted frame 60 is freely swingable laterally of and in a dependent relation from the main boom section 44.

Telescopically received within the lower end of the front tubular member 61 (FIGS. 2 and 5) for adjustment longitudinally thereof is a rod member 66. Adjustment is obtained by the provision of a series of longitudinally spaced holes 67 formed in the rod 66 and a pair of oppositely arranged holes 68 formed in the front tubular member 61. When a hole 67 is in alignment with the holes 68 a locking pin 69 inserted therethrough holds the rod 66 in a longitudinally adjusted position relative to the front tubular member 61.

Secured to the bottom end of the rod 66 is a pipe contact member or saddle 71 (FIGS. 2 and 5) comprised of an elongated flat plate member that is bowed longitudinally and extends transversely of the boom main section 44. The concave surface of the contact member 71 is faced downwardly and the rod 66 is secured to the top central portion thereof.

The rear tubular member 62 carries in a telescopic relation a rod 72 (FIGS. 2 and 10) for longitudinal adjustment in all ways similar to the rod 66 for the front tubular member 61. Supported at the lower end of the rod 72 is the pipe jaw unit or clasping means 24 that includes a fixed jaw member 73 secured adjacent one end of the rod 72 and extended downwardly and outwardly therefrom. A pivoted jaw member 74 has one end pivotally connected at 76 to the upper end of the fixed jaw 73. The jaw members 73 and 74 are of a curved shape and arranged with the concave surfaces thereof facing each other and with the pivoted jaw 74 being pivotally movable to open and closed positions relative to the fixed jaw 73.

The jaw 74 is pivotally moved by a double acting hydraulic cylinder assembly 77 (FIGS. 10 and 11) that has one end pivotally connected at 78 to an upper arm extension 79 secured to the pivoted jaw 74 at a position to one side of the rod 72. The opposite end of the cylinder assembly 77 is pivoted at 81 to the upper end of a leverage arm 82, the lower end of which is secured to the rod 72. The leverage arm 82 extends upwardly and outwardly from the rod 72 so that its upper end is located above the pivoted jaw 74.

On extension of the cylinder assembly 77 the jaw unit 24 is opened to receive a pipe 19 between the jaws 73 and 74 thereof. In this open position of the jaw unit 24, and as shown in FIG. 10, the free ends of the jaws 73 and 74 are substantially located in a common horizontal plane. On retraction of the cylinder assembly 77 the jaw 74 is moved to a closed position relative to the fixed jaw 73 so that the pipe 19 is clasped between the jaw members 73 and 74. The pivotal movement of the jaw 74 is about an axis extended longitudinally of the boom main section 44 so that a pipe 19 held between the jaws 73 and 74 also extends longitudinally of the boom main section 44.

In the use of the attachment let it be assumed that a pipe 19 is to be lifted from the ground onto the trailer vehicle 18. Thus, as shown in FIG. 7, the cylinder assembly 52 is actuated to move the boom main section 44 downwardly to a position generally above the pipe 19. By virtue of the free pivotal swinging movement of the pivoted frame 60 and the path of movement of the boom section 44 through an upright arc the frame 60 as it approaches the pipe 19 is moved in a substantially vertical path above the pipe. Should this vertical movement, as a result of the pivotal movement of the boom 23, be insufficient to position the pipe 19 between the open jaws 73 and 74 the control arm 33 of the hydraulic lift mechanism 17 may be actuated to tilt the boom downwardly and rearwardly.

With a pipe 19 located between the jaws 73 and 74 the hydraulic cylinder assembly 77 is operated to close the jaws. On upward pivotal movement the boom 23 from its position in FIG. 7 toward its upright position shown in FIG. 6 the pipe 19 is tilted forwardly and downwardly until its forward section is moved into bearing engagement with the contact plate 71. In this respect it is to be noted, and as best appears in FIG. 1, that the contact plate 71 and jaw unit 24 are spaced longitudinally of the main boom section 44 a distance apart that is less than one half of the length of the pipe 19 being handled. Since the section of the pipe 19 extended rearwardly from the jaw unit 24 is thus of a greater length than the pipe section extended forwardly from the jaw unit 24 and, therefore, of a greater weight than the forwardly extended pipe section, the jaw unit 24 functions as a fulcrum to provide for the downward and rearward tilting action of the pipe 19.

With the pipe 19 held between the jaws 73 and 74 and in bearing engagement with the contact plate 71 the boom 23 is swung to its top position shown in FIG. 6 to locate the pipe above the trailer 18. The control arm 33 is then manipulated until the rear end of the pipe is adjacent the loading deck on the trailer and the cylinder 77 is then actuated to release the pipe 19 onto the trailer. The above loading operation is reversed when the pipe 19 is to be removed from the trailer for positions onto the ground.

In the operation of the attachment 15 it has been found to be desirable that the rod members 66 and 72 be relatively adjusted so that the jaw unit 24 is at a lower level than the contact member 71. This adjustment provides for the contact member 71 always being in a clearance relation with a pipe that is to be picked up by the jaw unit 24. Additionally, it will be understood that in the loading of the trailer 18 the pipes 19 will be initially extended end to end along the ground so that the tractor 16 can follow a path substantially parallel to the strung out pipes.

As shown in FIG. 12 the cylinder assemblies 52 and 77 are supplied with a fluid under pressure from a usual pump unit 83 provided on the tractor 16 which includes a pump 84 and a reservoir 86. The pump outlet line 87 is common to supply lines 88 and 89 for the cylinder assemblies 52 and 77, respectively. The fluid from the cylinder assemblies 52 and 77 is discharged through exhaust lines 91 and 92, respectively, each of which is connected to the reservoir 86. A three way valve 93 is connected in each of the supply lines 88 and 89 to separately control the operation of the cylinder assemblies 52 and 77.

I claim:
1. A pipe-handling attachment for a tractor having a hydraulic lift mechanism mounted on the rear end thereof comprising:
   (a) a mounting frame supported on said lift mechanism,
   (b) a boom member having a main section extended rearwardly of the tractor and a downwardly projected front section,
   (c) means pivotally supporting the lower end of said front section on said mounting bracket for pivotal movement of the boom member about an axis extended longitudinally of the tractor,
   (d) linearly extendable and retractable power means connected to said front section and to said mounting frame for pivotally moving said boom member,
   (e) an upright pivoted frame arranged longitudinally of said main section,
   (f) means pivotally connecting the upper end of said pivoted frame to said main section for free swinging movement about an axis extended longitudinally of the main section,
   (g) means supported from the rear end of said frame for releasably clasping a pipe, and
   (h) means supported from the front end of said frame for contact engagement with a top side portion of a pipe held by said clasping means.

2. The pipe-handling attachment for a tractor according to claim 1 wherein:
   (a) said pipe contact means and clasping means are spaced a distance apart that is less than one-half the length of a pipe to be handled, whereby when a pipe is releasably clasped intermediate the ends thereof by said clasping means a top side portion of the pipe at the end thereof adjacent said boom front section is in bearing engagement with said contact means.

3. The pipe-handling attachment for a tractor according to claim 1 including:
   (a) means adjustably supporting said clasping means on said pivotal frame for up and down movement relative thereto, and
   (b) other means adjustably supporting said contact means on said pivoted frame for up and down movement relative thereto.

4. The pipe-handling attachment for a tractor according to claim 3 wherein:
   (a) each of said adjustable supporting means includes an upright tubular member and an upright member telescopcially received within the lower end of said tubular member for up and down adjustable movement relative thereto.

5. The pipe-handling attachment for a tractor according to claim 4 wherein:
   (a) said contact means comprises an arcuate plate member secured to the lower end of the upright member corresponding thereto with the concave surface thereof faced downwardly, said plate member extended transversely of said pivotal frame and of a size to loosely receive a pipe against the concave surface thereof.

6. The pipe-handling attachment for a tractor according to claim 4 wherein:
   (a) said clasping means includes a first curved jaw member secured to and extended downwardly from the lower end of the upright member corresponding thereto,
   (b) a second curved jaw member pivotally connected to the upper end of said first jaw member for opening and closing movement relative thereto, and
   (c) a hydraulic cylinder assembly for pivotally moving said second jaw member pivotally interconnected to said corresponding upright member and to said second jaw member.

References Cited

UNITED STATES PATENTS

| | | | |
|---|---|---|---|
| 3,064,840 | 11/1962 | Ilon | 214—147 XR |
| 3,072,271 | 1/1963 | Costello | 214—77 |
| 3,239,082 | 3/1966 | Herolf | 214—147 XR |

GERALD M. FORLENZA, Primary Examiner

FRANK E. WERNER, Assistant Examiner

U.S. Cl. X.R.

214—77